US012191101B2

(12) United States Patent
Huettinger et al.

(10) Patent No.: US 12,191,101 B2
(45) Date of Patent: Jan. 7, 2025

(54) FUSE HAVING AN INTEGRATED MEASURING FUNCTION, AND FUSE BODY

(71) Applicant: Siemens Aktiengesellschaft, Munich (DE)

(72) Inventors: Robert Huettinger, Schoefweg (DE); Jean-Mary Martel, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 767 days.

(21) Appl. No.: 17/414,412

(22) PCT Filed: Dec. 18, 2019

(86) PCT No.: PCT/EP2019/085958

§ 371 (c)(1),
(2) Date: Jun. 16, 2021

(87) PCT Pub. No.: WO2020/127488

PCT Pub. Date: Jun. 25, 2020

(65) Prior Publication Data

US 2022/0093356 A1 Mar. 24, 2022

(30) Foreign Application Priority Data

Dec. 20, 2018 (DE) ..................... 10 2018 222 552.4

(51) Int. Cl.
*H01H 85/02* (2006.01)

(52) U.S. Cl.
CPC . *H01H 85/0241* (2013.01); *H01H 2085/0266* (2013.01); *H01H 2085/0275* (2013.01); *H01H 2085/0291* (2013.01)

(58) Field of Classification Search
CPC ....... H01H 85/0241; H01H 2085/0266; H01H 2085/0275; H01H 2085/0291
See application file for complete search history.

(56) References Cited

U.S. PATENT DOCUMENTS 6,211,768 B1 * 4/2001 Cress .................. H01H 85/042 337/171
6,778,389 B1 8/2004 Glovatsky et al.
(Continued)

FOREIGN PATENT DOCUMENTS

CN 101151943 A 3/2008
CN 101461113 A 6/2009
(Continued)

OTHER PUBLICATIONS

PCT International Search Report and Written Opinion of International Searching Authority mailed Feb. 21, 2020 corresponding to PCT International Application No. PCT/EP2019/085958 filed Dec. 18, 2019.
(Continued)

*Primary Examiner* — Jue Zhang
*Assistant Examiner* — Afework S Demisse
(74) *Attorney, Agent, or Firm* — Harness, Dickey & Pierce, P.L.C.

(57) ABSTRACT

A fuse includes an integrated measuring function. In an embodiment, the fuse includes a fuse housing including a first receiving space delimited by a pressure body and a second receiving space spatially separated from the first receiving space. A fusible conductor is mounted in the first receiving space and a measuring device is accommodated and mounted in the second receiving space. The measuring device has a current transformer and an electronic assembly, electrically conductively connected to the current transformer. Viewed in a direction of longitudinal extent, a height of the current transformer essentially corresponds to a height of the second receiving space. With the aid of the measuring device, it is possible to determine the electric current flowing through the fuse in the immediate vicinity of the fuse. Energy required is generated from the primary current of the
(Continued)

fuse by electromagnetic induction, meaning no external power source is required.

19 Claims, 4 Drawing Sheets

(56) References Cited

U.S. PATENT DOCUMENTS

| | | | |
|---|---|---|---|
| 10,784,065 | B2 | 9/2020 | Signer et al. |
| 11,508,541 | B2 | 11/2022 | Huettinger et al. |
| 2002/0181221 | A1 | 12/2002 | Ries |
| 2004/0264092 | A1 | 12/2004 | Grunbichler et al. |
| 2005/0231320 | A1 | 10/2005 | Ackermann |
| 2008/0042796 | A1 | 2/2008 | Moffat |
| 2008/0093110 | A1 | 4/2008 | Bagung |
| 2009/0108980 | A1 | 4/2009 | Tsuchido |
| 2009/0237198 | A1 | 9/2009 | Yang |
| 2012/0242449 | A1 | 9/2012 | Faltermeier et al. |
| 2013/0335188 | A1 | 12/2013 | Faltermeier et al. |
| 2015/0285841 | A1 | 10/2015 | Doljack et al. |
| 2015/0294826 | A1 | 10/2015 | Kim et al. |
| 2015/0301111 | A1 | 10/2015 | Bruchmann |
| 2016/0013631 | A1 | 1/2016 | Ehrler et al. |
| 2016/0035529 | A1 | 2/2016 | Durth |
| 2016/0064173 | A1 | 3/2016 | Bukacek et al. |
| 2018/0331571 | A1* | 11/2018 | Smit ...................... H01H 9/167 |
| 2020/0051768 | A1* | 2/2020 | Moebis .............. H01H 85/0241 |
| 2022/0059307 | A1 | 2/2022 | Huettinger et al. |
| 2022/0068582 | A1 | 3/2022 | Hochmuth et al. |

FOREIGN PATENT DOCUMENTS

| | | | | |
|---|---|---|---|---|
| CN | 101483117 | A | 7/2009 | |
| CN | 102779701 | A | 11/2012 | |
| CN | 203747397 | U | 7/2014 | |
| CN | 204360906 | U | 5/2015 | |
| CN | 106688074 | A | 5/2017 | |
| CN | 207097771 | U | 3/2018 | |
| CN | 108475601 | A | 8/2018 | |
| DE | 3411323 | A1 | 10/1985 | |
| DE | 19523725 | C2 | 6/1997 | |
| DE | 19836815 | A1 | 2/2000 | |
| DE | 10224007 | A1 | 12/2002 | |
| DE | 102004033401 | A1 | 2/2005 | |
| DE | 10 2005 012 404 | | 9/2006 | |
| DE | 102011005884 | A1 | 9/2012 | |
| DE | 102012210292 | A1 | 12/2013 | |
| DE | 102014205871 | A1 | 10/2015 | |
| DE | 102016211621 | A1 | 12/2017 | |
| EP | 0917723 | B1 | 3/2000 | |
| EP | 1116252 | B1 | 7/2002 | |
| EP | 1513180 | A1 | 3/2005 | |
| EP | 1560245 | A1 | 8/2005 | |
| EP | 2116855 | A2 | 11/2009 | |
| EP | 2423693 | A1 | 2/2012 | |
| EP | 2885800 | A1 | 6/2015 | |
| EP | 2985779 | A1 | 2/2016 | |
| EP | 3026445 | B1 | 8/2017 | |
| FR | 715818 | A | 12/1931 | |
| JP | H11273544 | A | 10/1999 | |
| JP | 2018163052 | A | 10/2018 | |
| KR | 101389709 | B1 | 4/2014 | |
| KR | 101747792 | * | 6/2017 | ............. H01F 38/28 |
| KR | 101747792 | B1 | 6/2017 | |
| WO | WO-2014026702 | A1 | 2/2014 | |
| WO | WO 2017078525 | A1 | 5/2017 | |

OTHER PUBLICATIONS

German Search Report for German Patent Application No. 102018222552.4 received Oct. 21, 2019.

* cited by examiner

FUSE HAVING AN INTEGRATED MEASURING FUNCTION, AND FUSE BODY

PRIORITY STATEMENT

This application is the national phase under 35 U.S.C. § 371 of PCT International Application No. PCT/EP2019/085958 which has an International filing date of Dec. 18, 2019, which designated the United States of America and which claims priority to German application DE 102018222552.4 filed Dec. 20, 2018, the entire contents of each of which are hereby incorporated herein by reference.

FIELD

Embodiments of the disclosure generally relate to a fuse in which a measurement function is integrated. Embodiments of the disclosure furthermore generally relate to a fuse body for a fuse with an integrated measurement function.

BACKGROUND

Conductors that are flowed through by an electric current heat up. In the case of impermissibly high currents, this may result in an impermissibly great heating of the conductor and, as a result, in melting of the insulation surrounding the conductor, which may thus lead to results as severe as a cable fire. To prevent this fire risk, in the event of an occurrence of an excessively high electric current, that is to say of an overload current or of a short-circuit current, this electric current has to be promptly disconnected. This is ensured using what are known as overcurrent protection apparatuses.

One example of such an overcurrent protection apparatus is, for example, a fuse that interrupts the circuit through the melting of one or more fuse elements when the current strength of the circuit secured by the fuse exceeds a particular value for more than a particular time. The fuse includes an insulating body, which has two electrical terminals that are electrically conductively connected to one another by one or more fuse elements inside the insulating body. The fuse element, which has a reduced cross section in comparison with the rest of the conductors in the circuit, is heated by the current flowing through it and melts when the critical nominal current of the fuse is significantly exceeded for a predetermined time. Ceramic is mostly used as the material for the insulating body due to its good insulation properties. The use of a fuse in this manner is already known in principle for example from European patent document EP 0 917 723 B1 or from German laid-open documents DE 10 2014 205 871 A1 and DE 10 2016 211 621 A1.

Fuses are able to be obtained in various structural types. In addition to simple device fuses, which have a simple glass cylinder in which the fuse element is received, there are also structures in which the ceramic body is filled with sand—mainly quartz sand: in this case, a distinction is drawn between types having solidified and having unsolidified quartz sand. In the case of a fuse solidified with sand, the fuse element is surrounded by quartz sand. The housing of the fuse is generally in this case formed by a ceramic body in which the solidified sand, the electrical terminals and the fuse element are received or held. The quartz sand in this case functions as a light arc-extinguishing means: if the nominal current of the fuse is significantly exceeded—for example due to a high short-circuit current—then this leads to the fuse being stressed, during which stress the fuse element first of all melts and then evaporates due to the high temperature development. This gives rise to an electrically conductive plasma by way of which the current flow between the electrical terminals is first of all maintained—a light arc forms. Since the metal vapor of the evaporated fuse element precipitates on the surface of the grains of quartz sand, the light arc is in turn cooled. As a result, the resistance inside the fuse insert increases such that the light arc is ultimately extinguished. The electrical line to be protected by the fuse is thus interrupted.

Low-voltage high-power fuses, what are known as NH fuses, but also semiconductor fuses, what are known as HLS fuses, as are marketed for example under the product name SITOR, are already known in principle from the prior art in the field of fuses. In the case of NH fuses, one or more fuse elements in the form of metal strips are normally used. In this case, the fuse elements mostly have what are known as rows of narrow points in order to selectively disconnect the fuse. Furthermore, at least one solder deposit may be applied to one or more of the fuse elements, by way of which solder deposit the overload characteristic of the fuse is able to be influenced. The critical permitted power value I2t for the disconnection behavior of the fuse is relatively high in the case of NH fuses, as a result of which these have a somewhat more lethargic characteristic.

If the fuse element is heated by an electric overload current to a temperature that lies above the melting temperature of the solder, then this solder diffuses into the fuse element material and forms an alloy therewith. The electrical resistance of the fuse element thereby increases, which leads to further heating thereof, as a result of which the diffusion procedure is accelerated further until the fuse element has completely dissolved into the surroundings of the solder deposit, such that it breaks off, as a result of which the current flow is interrupted. In the case of a brief, permissible overcurrent, no early disconnection takes place by virtue of the NH fuse. If a short-circuit current occurs, by contrast, the fuse element tears off at the rows of narrow points. As a result, a plurality of small series-connected light arcs arise at the same time whose voltages add up and thus lead to quicker disconnection of the fuse. NH fuses serve, for example, to protect installations or switching cabinets from fire, for example caused by overheated connecting lines.

On the part of the operators of electrical installations, there is an increasing desire to be able to determine the state of an electrical installation in a timely fashion. In the past, this was often carried out by way of a visual check—in the case of fuses, for example, in that the fuses are equipped with an indicator that optically signals tripping of the respective fuse externally on the housing of the fuse in question. For the future, however, it is increasingly required to be able to query this information at any time and as far as possible in a manner independent of location, for example from a control station. For this reason, electrical installation devices are increasingly being supplemented so as to provide information about their operating state. Electrical switching devices, for example, fire protection switches, which already have dedicated control logic, are able to be supplemented with relatively little expenditure so as to prepare and provide corresponding information.

In the case of fuses, there are corresponding solutions involving recording and forwarding the “triggered” information, provided optically by the indicator, by way of a communication module able to be attached to the fuse. Attachable solutions, however, have the disadvantage that they require additional installation space and are therefore able to be used only with relatively high expenditure in pre-existing installations. For a simple retrofit use, in which an existing fuse of a conventional design without a communication module is replaced with a new fuse having a corresponding communication module within the meaning of retrofitting or modernization of the installation, these attachable solutions are often not used as the additional installation space required therefor is not available.

To solve this problem of limited installation space, which occurs especially in the case of retrofit applications, international patent application WO 2017/078525 A1 describes a fuse in which a current sensor is integrated into the pressure body of the fuse. By way of this current sensor, the current flow through the fuse occurring during normal operation is able to be measured and transmitted to a querying unit arranged outside the fuse.

SUMMARY

The inventors have discovered that since comparatively high temperatures may also, however, occur in a fuse, it is questionable as to how reliably a sensor integrated into the pressure body of the fuse functions over the service life of the fuse.

An embodiment provides a fuse and a fuse body that at least partly overcome the abovementioned problems.

At least one embodiment of the invention is directed to a fuse and fuse body. Advantageous configurations of the fuse according to at least one embodiment of the invention and of the fuse body according to at least one embodiment of the invention are the subject matter of the claims.

The fuse according to at least one embodiment of the invention having an integrated measurement function has a fuse housing, which for its part has a first reception space limited by a pressure body and also a second reception space physically delimited from the first reception space. Here, a fuse element is received and held in the first reception space, a measurement device is received and held in the second reception space. The measurement device in this case has a transformer and also an electronics assembly electrically conductively connected to the transformer. As seen in a direction of longitudinal extent L, the height of the transformer in this case corresponds substantially to the height of the second reception space, for which reason the electronics assembly is arranged laterally to the transformer in a direction orthogonal to the direction of longitudinal extent.

The fuse body according to at least one embodiment of the invention for a fuse with an integrated measurement function of the abovementioned type comprises:

- a first section designed as a pressure body, which limits the first reception space for receiving the fuse element, and a second section designed as a protective body, which limits the second reception space for receiving the measurement device. The first reception space and the second reception space are arranged physically delimited from one another in the fuse body in this case.

BRIEF DESCRIPTION OF THE DRAWINGS

Two example embodiments of the fuse are explained in more detail in the following text with reference to the appended figures. In the figures.

In the various figures of the drawing, identical parts are always provided with the same reference signs. The description applies to all of the drawing figures in which the corresponding part is likewise able to be seen.

DETAILED DESCRIPTION OF THE EXAMPLE EMBODIMENTS

Figure 1:
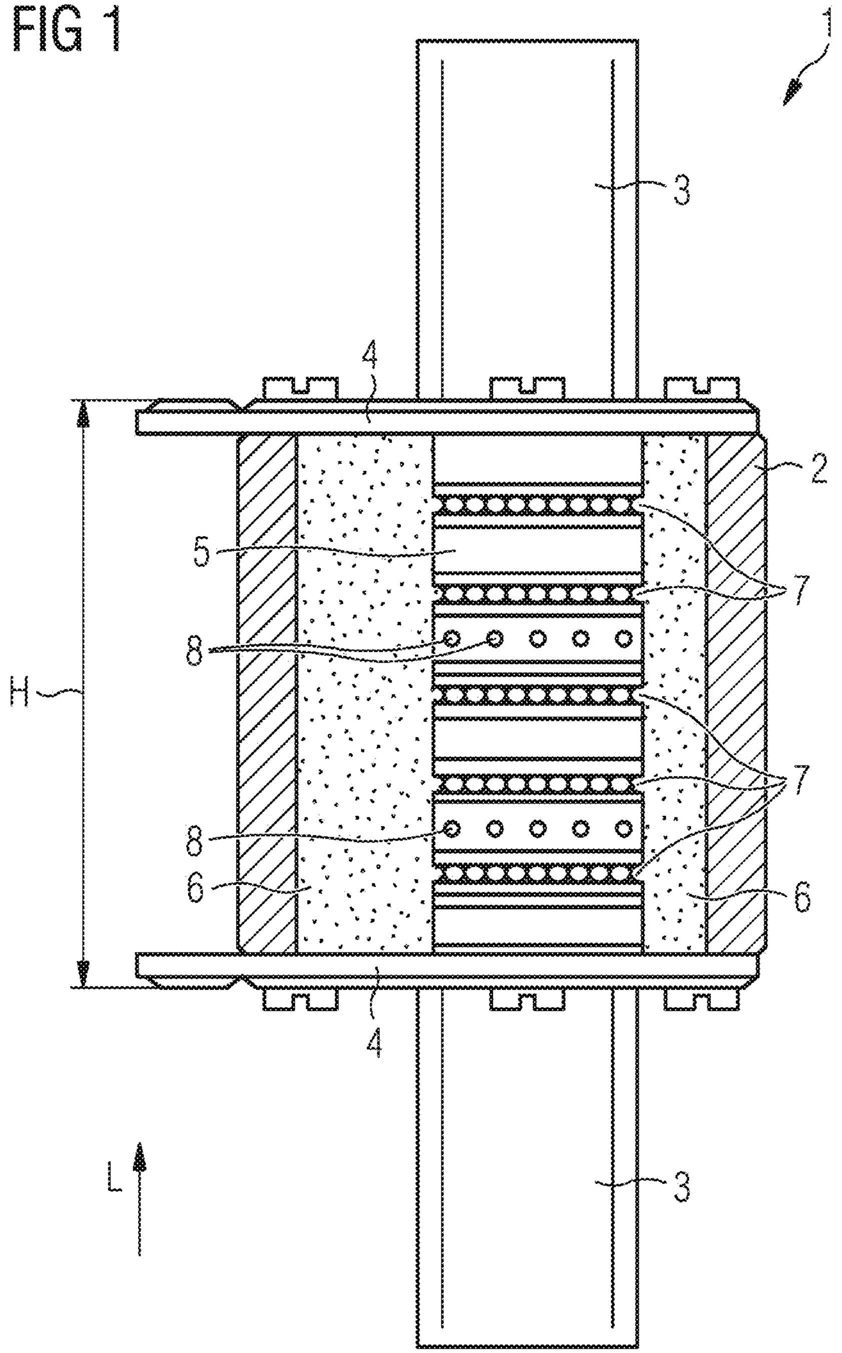
FIG. 1 is a schematic illustration of an NH fuse known from the prior art.

The fuse according to at least one embodiment of the invention having an integrated measurement function has a fuse housing, which for its part has a first reception space limited by a pressure body and also a second reception space physically delimited from the first reception space. Here, a fuse element is received and held in the first reception space, a measurement device is received and held in the second reception space. The measurement device in this case has a transformer and also an electronics assembly electrically conductively connected to the transformer. As seen in a direction of longitudinal extent L, the height of the transformer in this case corresponds substantially to the height of the second reception space, for which reason the electronics assembly is arranged laterally to the transformer in a direction orthogonal to the direction of longitudinal extent.

With the aid of the measurement device, it becomes possible to identify the electric current flowing through the fuse directly at the fuse. The first and the second reception space are arranged here behind one another in a direction of longitudinal extent L of the fuse, that is to say in an axial direction. In this case, the pressure body serves to receive the pressure occurring when the fuse is heated or tripped. High requirements are therefore placed on the mechanical strength and stability of the protective housing. In contrast thereto, only one protective housing is necessary to delimit the second reception space in order to receive and to fasten the measurement device and to protect it against external disruptions such as moisture and/or dirt. Considerably lower requirements are therefore placed on the mechanical stability of this housing.

The transformer arranged in the second reception space serves here on the one hand as a current sensor, which forwards the detected current measurement values to the electronics assembly, where the measurement values are processed further. On the other hand, the energy required for this is likewise generated with the aid of the transformer by electromagnetic induction from the primary current, that is to say the operating current of the fuse. The transformer therefore also serves as energy source for the electronics assembly. In order to provide sufficient energy for the electronics assembly even in the case of low operating currents of the fuse and therefore to ensure the reliability of the measurement device, the transformer must be dimensioned to be relatively large for this purpose.

At the same time, the fuse must be kept compact in order to also be able to be used for retrofit applications in the context of retrofitting or modernization of existing systems, in which a conventional fuse without a measurement device is replaced. Since the fuse ideally in this case has the dimensions of a standardized NH fuse, the second reception space in which the measurement device is received and held, in particular in the axial direction, that is to say in the direction of longitudinal extent, is greatly limited. In order to be able to arrange the largest possible transformer in the second reception space, the electronics assembly is arranged laterally, that is to say in the radial direction, next to the transformer, more specifically: is arranged between the transformer and an inner wall of the second reception space. In this way, the transformer can be dimensioned so that the height thereof corresponds to the height of the second reception space, that is to say the transformer fully assumes the height of the second reception space. The volume of the transformer can therefore be optimized to the extent that the energy provided for the electronics assembly is as great as possible. In this way, it is possible to construct a fuse with an integrated measurement function that does not require an external current source for supplying energy to the measurement device.

In one advantageous development of the fuse, the electronics assembly has a printed circuit board. In order to meet the requirements of the most compact possible design of the measurement apparatus at the same time as the greatest possible transformer volume, it is necessary for the electronics assembly to also be designed as compactly as possible. This is possible by way of a printed circuit board that is kept compact, for example by using integrated circuits.

In a further advantageous development of the fuse, the printed circuit board has at least two rigid sections, which are electrically conductively connected to one another by a flexible region. In order to be able to arrange the printed circuit board in the second reception space, that is to say in the region between the transformer and the inner wall of the protective housing, in the most space-saving manner possible, it is advantageous to divide the printed circuit board into a plurality of rigid sections, which are electrically conductively connected to one another by flexible regions. Both flexible conductors and what are known as rigid-flex printed circuit boards, in which the flexible regions consist of printed circuit board material, wherein the rigid outer layers have been removed, are considered for this purpose.

In a further advantageous development of the fuse, the electronics assembly has a transmission device in order to transmit a measurement signal detected by the measurement device to a reception device arranged outside of the fuse.

The determined measurement data or else data processed further based on said measurement data can be transmitted to an external unit, for example a data collection device or a control room, with the aid of the transmission device. In this way, it is possible to be able to determine the operating state of the fuse at any time without a technician or an installer who inspects the fuse on site being required for this.

In a further advantageous development of the fuse, the measurement signal is transmitted wirelessly by the transmission device to the reception device.

Wireless transmission of the data to the external reception device significantly simplifies the installation expenditure of the fuse. For the wireless transmission of the data—measurement values or preprocessed data based on measurement values—by the transmission device to the reception device, common transmission methods such as Bluetooth, RFID (both active and passive), Zigbee, etc. come into consideration, for example. The energy required for the transmission is advantageously obtained here again with the aid of the transformer by electromagnetic induction from the primary current.

In a further advantageous development of the fuse, the overall installation space required for the fuse corresponds to the installation space of a standardized NH fuse. By virtue of the fuse with an integrated measurement function according to the invention corresponding in terms of its installation size to the size of a conventional NH fuse, said fuse is also able to be used for retrofit applications in the context of retrofitting or modernization of existing systems in the context of which a conventional fuse without a measurement device is replaced with a fuse with an integrated measurement function.

The fuse body according to at least one embodiment of the invention for a fuse with an integrated measurement function of the abovementioned type comprises:

- a first section designed as a pressure body, which limits the first reception space for receiving the fuse element, and a second section designed as a protective body, which limits the second reception space for receiving the measurement device. The first reception space and the second reception space are arranged physically delimited from one another in the fuse body in this case.

The first section of the fuse body is in this case designed in a pressure-stable manner, that is to say to receive the pressure occurring when the fuse is tripped and therefore constitutes the actual pressure body of the fuse, while the second section merely constitutes a protective function for the measurement device with significantly lower demands being placed on the mechanical stability and strength thereof. The different mechanical strength properties of the two sections are able to be realized by means of a suitable manufacturing method, for example a 3D printing method. The first and the second section in this case form one structural unit, that is to say the two sections must not be assembled first upon exchange or assembly of the fuse but they are already fixedly connected to one another, as a result of which the assembly expenditure is simplified significantly.

In one advantageous development, the fuse body is designed in one part. In particular with respect to the production of the fuse body with the aid of an additive manufacturing process, colloquially also referred to as "3D printing", a one-part embodiment of the fuse body is advantageous since this prevents subsequent assembly steps. The assembly costs can be reduced further as a result.

In a further advantageous development, the fuse body is formed from a ceramic material or a thermostable plastic. Ceramic materials are particularly suitable for manufacturing a fuse body due to their high pressure resistance. Thermostable plastics, provided that they are sufficiently thermally stable, are distinguished by contrast by their simplified processability with at the same time comparatively low manufacturing costs.

In a further advantageous development, the fuse body is designed with multiple parts, wherein the pressure body is fixedly but detachably connected to the protective body. This results in the advantage that, after the fuse has tripped, the second reception space in which the measurement device is received is possibly able to be reused. This is in particular beneficial when the material costs and manufacturing costs of the measurement device are comparatively high in comparison with the rest of the fuse.

In a further advantageous embodiment of the fuse body, the pressure body and the protective body are formed from different materials. In this way, both reception spaces are able to be adapted to the different requirements respectively placed on them.

In a further advantageous development of the fuse body, the pressure body and the protective body are surrounded by an additional sleeve. Using the additional sleeve, which may also consist, for example, of paper or a plastic coating, the structural unit of the fuse body is accentuated. Furthermore, in multi-part designs, the disassembly by unauthorized third parties is prevented or at least indicated.

In a further advantageous development of the fuse body, the overall installation space required for the fuse corresponds to the installation space of a standardized NH fuse. As a result, the fuse body can also be used for retrofit fuses, that is to say as a replacement for a conventional fuse without a measurement function.

FIG. 1 schematically shows the basic structure of a standardized NH fuse, as is already previously known from the prior art. The fuse 1 has two connection elements 3, which consist of an electrically conductive material, for example copper. In the illustrations, the connection elements 3 are designed as blade contacts—this is, however, not essential to the invention. The connection elements 3 are fixedly and tightly mechanically connected to a protective housing 2 with the height H that includes a solid, non-conductive and as far as possible heat-resistant material, for example of a ceramic, and serves as pressure body for the fuse 1. The protective housing 2 generally has a tubular or hollow-cylindrical basic shape and is externally closed in a pressure-tight manner, for example using two closure caps 4. The connection elements 3 in this case each extend through an aperture formed in the closure caps 4 into the cavity of the protective housing 2. In this cavity there is arranged at least one what is known as fuse element 5 that electrically conductively connects the two connection elements 3 to one another.

The rest of the cavity is for the most part completely filled with an extinguishing means 6 that serves to extinguish and cool the fuse 1 when it is tripped and completely surrounds the fuse element 5. Quartz sand is used as extinguishing means 6, for example. Instead of the one fuse element 5 illustrated in FIG. 1, it is likewise possible to arrange a plurality of fuse elements 5 electrically connected in parallel to one another in the protective housing 2, and correspondingly to make contact with the two contact elements 3. The trip characteristic curve—and therefore the trip behavior—of the fuse 1 is able to be influenced by the type, number, arrangement and layout of the fuse elements 3.

The fuse element 5 generally includes a material with good conductivity, such as copper or silver, and has a plurality of rows of narrow points 7 and one or more solder deposits 8—what are known as solder points—over its length, that is to say in its direction of longitudinal extent L. The direction of longitudinal extent L is therefore the parallel to an imaginary connecting line of the two connection elements 3. The trip characteristic curve of the fuse 1 is likewise able to be influenced and adapted to the respective case of application by the rows of narrow points 7 and the solder points 8. In the case of currents that are smaller than the nominal current of the fuse 1, only so much power loss is converted in the fuse element 5 that said power loss is quickly able to be output externally in the form of heat by way of the extinguishing sand 6, the protective housing 2 and the two connection elements 3. The temperature of the fuse element 5 in this case does not increase beyond its melting point. If a current that lies in the overload region of the fuse 1 flows, then the temperature inside the fuse 1 continuously further increases until the melting point of the fuse element 5 is exceeded and this melts through one of the rows of narrow points 7. In the case of high fault currents—as occur for example due to a short circuit—so much power is converted in the fuse element 5 that this is heated practically over the entire length and consequently melts at all of the rows of narrow points 7 at the same time.

Since liquid copper or silver still has good electrically conductive properties, the flow of current is not yet interrupted at this time. The melt formed from the fuse element 5 is therefore heated further until it finally transitions into the gaseous state, as a result of which a plasma forms. A light arc in this case occurs so as to further maintain the current flow through the plasma. In the last stage of a fuse disconnection, the conductive gases react with the extinguishing means 6, which for the most part includes quartz sand in the case of conventional fuses 1. This is melted due to the extremely high temperatures, brought about due to the light arc, in the environment of the light arc, which leads to a physical reaction of the molten fuse element material with the surrounding quartz sand 6. Since the reaction product occurring in this case is not electrically conductive, the current flow between the two connection elements 3 quickly drops to zero. In this case, however, it should be borne in mind that a corresponding mass of extinguishing means also requires a specific mass of fuse element material. Only in this way is it able to be ensured that there is still enough extinguishing means 6 present at the end of the fuse disconnection to effectively bind all of the conductive plasma.

Figure 2:
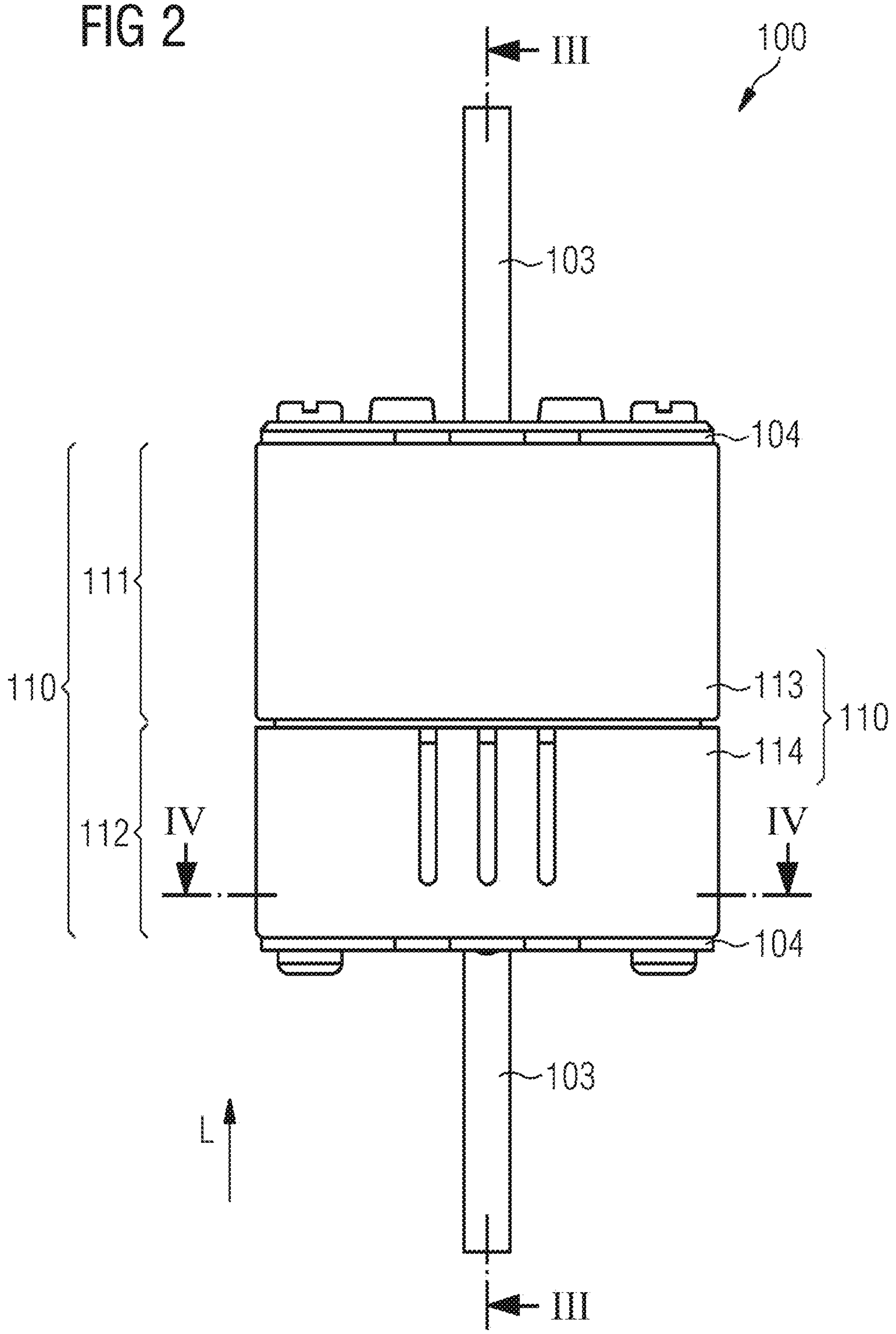
FIGS. 2 to 4 are schematic illustrations of a first example embodiment of the fuse according to the invention in various views.
Figure 3:
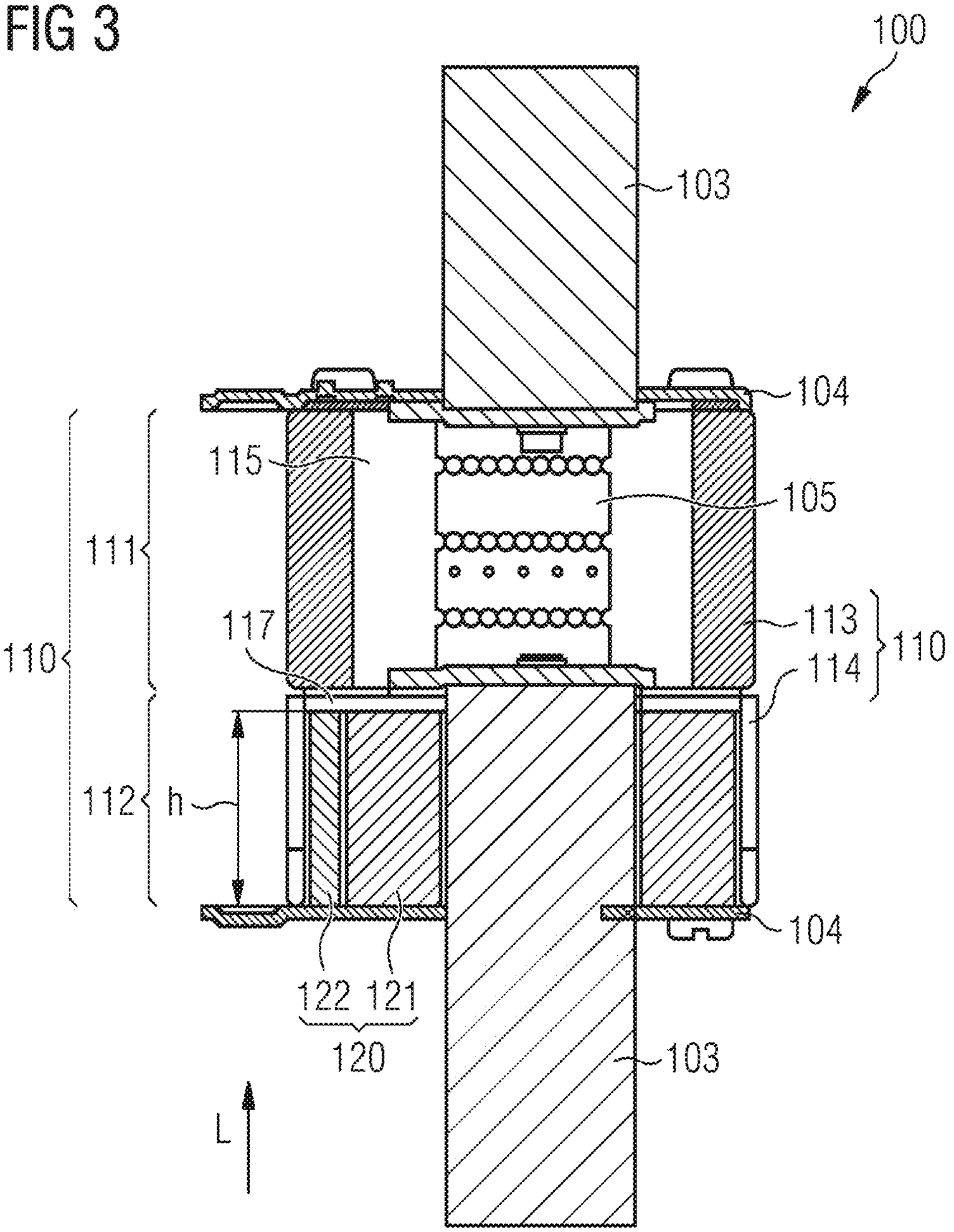
Figure 4:
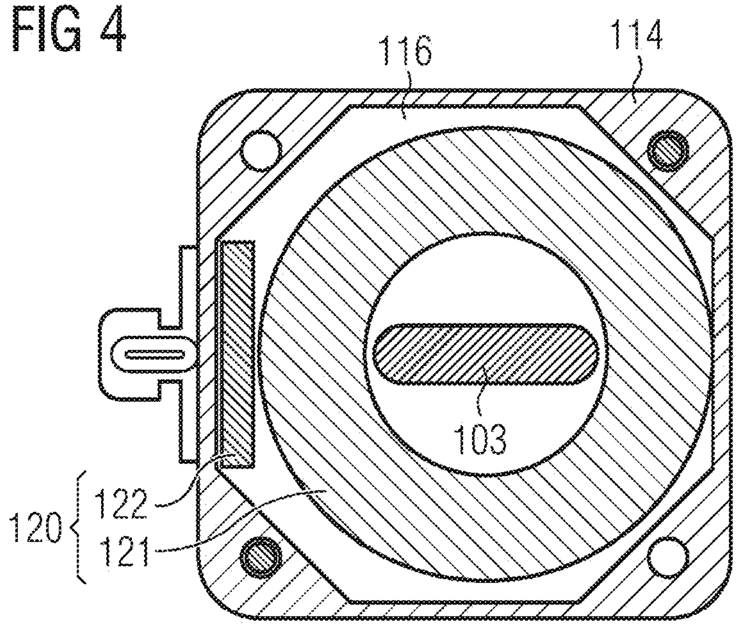

FIGS. 2 to 4 schematically illustrate a first example embodiment of the fuse 100 according to the invention. FIG. 2 in this case shows a side view of the fuse 100; FIGS. 3 and 4 show corresponding sectional illustrations of the fuse 100 in horizontal and vertical projection. The fuse 100 has a fuse housing 110 having a first section 111 and also a second section 112, which are arranged behind one another in a direction of longitudinal extent L of the fuse 100. The first section 111 is designed here as a pressure body 113 for receiving a fuse element 105. The pressure body 113 serves to receive the pressure occurring when the fuse 100 is heated or tripped, for which reason high demands are placed on the mechanical strength and stability of the pressure body 113. A first reception space 115 in which the fuse element 105 is received and held is therefore formed inside the pressure body 113. The first reception space 115 is delimited to the outside in the radial direction by the pressure body 113 and is closed by a closure element 104 in the axial direction, that is to say in the direction of the direction of longitudinal extent L. The installation size of the fuse housing 110 corresponds here to that of a standardized NH fuse, as described above with respect to FIG. 1. On account of the identical dimensions, the fuse 100 according to the invention is best suited for retrofit applications, that is to say as a replacement for a conventional NH fuse.

The fuse 100 has two connection elements 103, which are designed as blade contacts and which are fixedly and tightly mechanically connected to the fuse housing 110, for the purpose of electrical contact connection. However, the design of the two connection elements 103 is not essential to the invention. Inside the fuse 100, more specifically: in the first reception space 115, the fuse element 105 is electrically conductively connected to the two connection elements 103. If the fuse according to the invention is a fuse solidified with sand, the remaining volume of the first reception space 115 is filled with sand, generally quartz sand, which fully surrounds the fuse element 105 and serves as extinguishing means for extinguishing and cooling the fuse element 105 when it is tripped.

The second section 112 is designed as a protective body 114, which serves to receive a measurement device 120 and limits a second reception space 116 provided for this purpose to the outside. Since the protective body 114 only serves to receive and to fasten the measurement device 120 and to protect it against external disruptions such as moisture and/or dirt, significantly lower demands are placed on the mechanical stability of the protective body 114 than on that of the pressure body 113. The protective body 114 is in this case fixedly connected to the pressure body 113, wherein the first reception space 115 and the second reception space 116 are physically delimited from one another by a partition 117. The partition 117 may be a separate component; however, it is likewise possible to design the partition 117 as a constituent part of the pressure body 113 or of the protective body 114. The second reception space 116 is closed by a further closure element 104 counter to the direction of longitudinal extent L. The lower connection element 103 formed as a blade contact is inserted through the second reception space 116 into the first reception space 115 and is electrically conductively connected there to the fuse element 105 by the further closure element 104.

The measurement device 120 has a transformer 121 and an electronics assembly 122. With the aid of the measurement device 120, it becomes possible to identify the electric current flowing through the fuse 100 directly at the fuse. To this end, in the second reception space 116 formed in the protective body 114, a transformer 121 of the measurement device 120 is arranged around the lower connection element 103 so that it completely fills the second reception space 116 in terms of height. In other words: the height h of the transformer 121 corresponds substantially, that is to say within the usual dimensional tolerances upon assembly, in the direction of longitudinal extent L to the height of the second reception space 116—likewise considered in the direction of longitudinal extent L. In this way, the volume of the transformer 121 can be optimized, that is to say greatly increased, in order to ensure reliable measurement and transmission of the measurement data even in the case of a low primary current.

Upon closer consideration of the sectional illustrations shown in FIGS. 3 and 4, it becomes clear that the connection elements 103 are arranged not exactly centrally but somewhat off-center in the pressure body 113 or in the protective body 114. For the arrangement of the annular transformer 121 in the second reception space 116, this results in the radial extent of the transformer 121 being limited on one side by the inner wall of the protective body 114, whereas there is still installation space available on the opposite side. In this compulsorily free installation space between the transformer 121 and an inner wall of the protective housing 114 there is arranged, in a space-saving manner, an electronics assembly 122 of the measurement device 120, which is advantageously designed as a printed circuit board. In addition to a microprocessor for processing or preprocessing the determined measurement data, the electronics assembly 122 can also have a transmission device in order to transmit the measurement data or the processed data to a reception device (not illustrated) arranged outside of the fuse 100.

Figure 5:
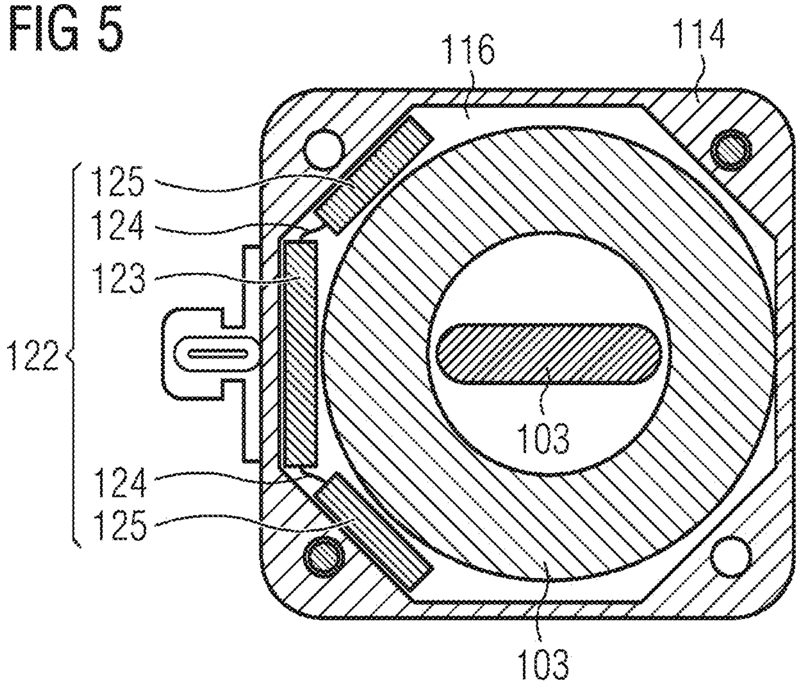
FIG. 5 is a schematic illustration of a second example embodiment of the fuse.

FIG. 5 schematically illustrates a second example embodiment of the fuse 100 according to the invention. The basic structure of the fuse 100 and of the fuse housing 110 corresponds here to the first example embodiment illustrated in FIGS. 2 to 4. The substantial difference from the first example embodiment consists in the electronics assembly 122 being formed as a rigid-flex printed circuit board. The term "rigid-flex printed circuit board" (rigid-flex PCB) is understood to mean a combination of rigid and flexible printed circuit board sections that are connected to one another in an undetachable manner. In the present case, the electronics assembly 122 has a central first rigid section 123, which is connected to a respective further rigid section 125 by means of a respective flexible section 124. In this way, the electronics assembly 122 can have a 3-dimensional layout and therefore be adapted optimally to the limited space conditions within the protective body 114. This solution furthermore offers the advantage of not having to assemble plug connections or line components in order to connect the individual rigid printed circuit board sections 123, 125, as a result of which both the space requirement and the assembly expenditure are reduced.

LIST OF REFERENCE SIGNS

1 Fuse
2 Protective housing/pressure body
3 Connection element
4 Closure cap
5 Fuse element
6 Extinguishing means/extinguishing sand
7 Row of narrow points
8 Solder deposit
100 Fuse
103 Connection element
104 Closure element
105 Fuse element
110 Fuse housing
111 First section
112 Second section
113 Pressure body
114 Protective body
115 First reception space
116 Second reception space
117 Partition
120 Measurement device
121 Transformer
122 Electronics assembly/printed circuit board
123 First rigid section
124 Flexible section
125 Further rigid section
H Height of the fuse body
h Height of the transformer
L Direction of longitudinal extent

The invention claimed is:

1. A fuse including an integrated measurement function, the fuse comprising:
- a fuse housing, the fuse housing including
  - a first reception space limited by a pressure body, and
  - a second reception space physically delimited from the first reception space by a partition element;
- a fuse element in the first reception space; and
- a measurement device in the second reception space, the measurement device including a transformer and an electronics assembly, and the measurement device electrically conductively connected to the transformer,
- wherein a height of the transformer, in a direction of longitudinal extent, corresponds to a height of the second reception space, and
- wherein the electronics assembly is lateral to the transformer, in a direction orthogonal to the direction of longitudinal extent.

2. The fuse of claim 1, wherein the electronics assembly includes a printed circuit board.

3. The fuse of claim 2, wherein the printed circuit board includes at least two rigid sections, electrically conductively connected to one another by a flexible region.

4. The fuse of claim 2, wherein the electronics assembly includes a transmission device configured to transmit a measurement signal, detected by the measurement device, to a reception device outside of the fuse.

5. The fuse of claim 4, wherein the transmission device is configured to transmit the measurement signal to the reception device wirelessly.

6. The fuse of claim 2, wherein an installation space for the fuse corresponds to an installation space of a standardized NH fuse.

7. The fuse of claim 1, wherein the electronics assembly includes a transmission device configured to transmit a measurement signal, detected by the measurement device, to a reception device outside of the fuse.

8. The fuse of claim 7, wherein the transmission device is configured to transmit the measurement signal to the reception device wirelessly.

9. The fuse of claim 1, wherein an installation space for the fuse corresponds to an installation space of a standardized NH fuse.

10. The fuse of claim 1, wherein the partition element physically delimits the first reception space from the second reception space in the direction of longitudinal extent.

11. A fuse body for a fuse, the fuse body comprising:

a first section, designed as a pressure body, configured to limit a first reception space of a fuse housing of the fuse for receiving a fuse element of the fuse; and a second section, designed as a protective body, configured to limit a second reception space of the fuse housing of the fuse, for receiving a measurement device of the fuse, wherein the first reception space and the second reception space are physically delimited from one another by a partition element in the fuse body.

12. The fuse body of claim 11, wherein the fuse body is one part.

13. The fuse body of claim 12, wherein the fuse body is formed from a ceramic material or a thermostable plastic.

14. The fuse body of claim 12, wherein the pressure body and the protective body are surrounded by an additional sleeve.

15. The fuse body of claim 12, wherein an installation space for the fuse corresponds to an installation space of a standardized NH fuse.

16. The fuse body of claim 11, wherein the fuse body is multiple parts, and wherein the pressure body is detachably connected to the protective body.

17. The fuse body of claim 16, wherein the pressure body and the protective body are formed from different materials.

18. The fuse body of claim 11, wherein the pressure body and the protective body are surrounded by an additional sleeve.

19. The fuse body of claim 11, wherein an installation space for the fuse corresponds to the installation space of a standardized NH fuse.

* * * * *